Figure 1:
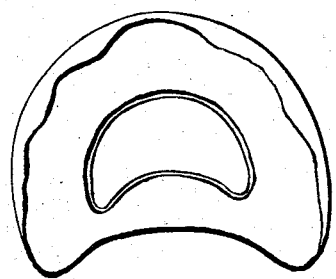
Figure 2:
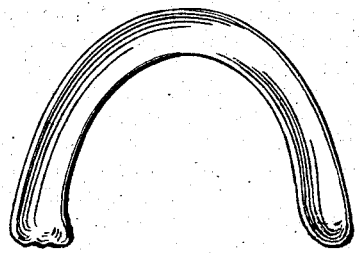

D. M. LAMB.
Dental-Plate.

No. 159,687.

Patented Feb. 9, 1875.

WITNESSES
Walter Allen
Henry Tanner

INVENTOR
Daniel Martin Lamb
By Knight Bros. Attorneys

UNITED STATES PATENT OFFICE.

DANIEL M. LAMB, OF LONDON, CANADA.

IMPROVEMENT IN DENTAL PLATES.

Specification forming part of Letters Patent No. 159,687, dated February 9, 1875; application filed November 17, 1874.

*To all whom it may concern:*

Be it known that I, DANIEL MARTIN LAMB, of London, in the Province of Ontario, Canada, have invented a new and useful Improvement in Dental Plates, of which the following is a specification:

The subject of my invention is a dental plate made from the vulcanized inspissated juice of plants of the asclepias or milkweed family, either alone or in combination with ordinary caoutchouc or india-rubber.

The accompanying drawings represent upper and lower dental plates of common form, to either of which my invention is applicable.

In carrying out my invention I employ processes set forth in Letters Patent Nos. 140,281, 140,282, 144,622, and 144,623 heretofore granted to me, or either of them, as may be necessary.

The vulcanized gum from the milkweed juice having been produced in its green state, either with or without an admixture of india rubber, it is properly molded and vulcanized to produce a dental plate in a manner similar to that which is now practiced with ordinary rubber.

I am aware that dental plates have before been constructed of vulcanite produced from other materials. This therefore I do not claim.

My improved dental plates constructed of the vulcanized inspissated juice of milkweed are found to possess peculiar characteristics, which distinguish them from rubber vulcanite dental plates, and give to my invention great practical value. My improved vulcanite is of a cool character, rendering it more agreeable as well as more healthful in use. It is entirely tasteless in the mouth, and when properly prepared and cleansed of its solvent, it is entirely inodorous. It is not liable to be acted upon chemically by the saliva.

The invention thus removes a serious and in many cases fatal difficulty in the use of rubber vulcanite dental plates, especially with patients who are or have been required to use mercury in any form. My improved vulcanite is also harder and stronger than that in common use, and it can readily be furnished at one fourth of the cost, which removes all temptation to or liability of adulteration.

It is used with good effect either alone or in combination with twenty or twenty-five per cent. of ordinary rubber vulcanite.

Another great advantage in my improved vulcanite in its application to dental plates consists in its capacity to bear a much higher degree of heat than india-rubber, so that it is not liable to destruction in the treatment which is necessary to complete vulcanization.

I claim as new and of my invention—

A dental plate constructed of the inspissated juice of milkweed, vulcanized either alone or in combination with india-rubber or other vulcanizable gum.

D. M. LAMB.

Witnesses:
OCTAVIUS KNIGHT,
CHAS. J. GOOCH.